United States Patent [19]

Frost

[11] Patent Number: 5,593,358

[45] Date of Patent: Jan. 14, 1997

[54] MULTI-SPEED MANUAL TRANSMISSION WITH TWO SIMPLE PLANETARY GEARSETS

[75] Inventor: Barry L. Frost, Waterford, Mich.

[73] Assignee: New Venture Gear, Inc., Troy, Mich.

[21] Appl. No.: 457,030

[22] Filed: Jun. 1, 1995

[51] Int. Cl.$^6$ ................................................ F16H 37/08
[52] U.S. Cl. ........................ 475/218; 475/207; 475/219; 74/329
[58] Field of Search .................................. 475/207, 218, 475/217; 74/325, 329

[56] References Cited

U.S. PATENT DOCUMENTS

| | | | |
|---|---|---|---|
| 3,106,855 | 10/1963 | Reichenbaecher | 475/207 X |
| 4,225,029 | 9/1980 | Ushijima | 192/18 A X |
| 4,312,248 | 1/1982 | Sugimoto et al. | 475/208 X |
| 4,368,650 | 1/1983 | Numazawa et al. | 475/208 X |
| 4,404,869 | 9/1983 | Numazawa et al. | 475/207 |
| 4,416,168 | 11/1983 | Arai et al. | 475/207 X |
| 4,592,250 | 6/1986 | Plasencia et al. . | |
| 4,638,688 | 1/1987 | Hiraiwa . | |
| 4,836,053 | 6/1989 | Eastman et al. . | |
| 4,976,666 | 12/1990 | Meyerle . | |
| 5,284,068 | 2/1994 | Frost . | |
| 5,351,569 | 10/1994 | Trick et al. | 475/207 X |
| 5,390,559 | 2/1995 | Thomas et al. | 475/207 X |

Primary Examiner—Charles A. Marmor
Assistant Examiner—Saul Rodriguez
Attorney, Agent, or Firm—Harness, Dickey & Pierce, P.L.C.

[57] ABSTRACT

A six speed manual transmission having a double planetary gearset consisting of two simple planetary gearsets for use in a motor vehicle. The transmission includes an input shaft, a mainshaft rotatably connected by constant-mesh gearwheels to the input shaft, and an output shaft. This assembly provides two dissimilar fixed speed ratios, with a first power path using the first fixed speed ratio and a second power path using the second fixed speed ratio. The first power path includes a first sliding synchronizer clutch, a second sliding synchronizer clutch, and a first planetary gearset. The second power path includes a third sliding synchronizer clutch and a second planetary gearset. In addition, the first and second power paths share a common brake. The transmission provides a plurality of forward speeds, a braked neutral and a reverse drive. The transmission may be applied in either front wheel or rear wheel drive vehicles.

34 Claims, 12 Drawing Sheets

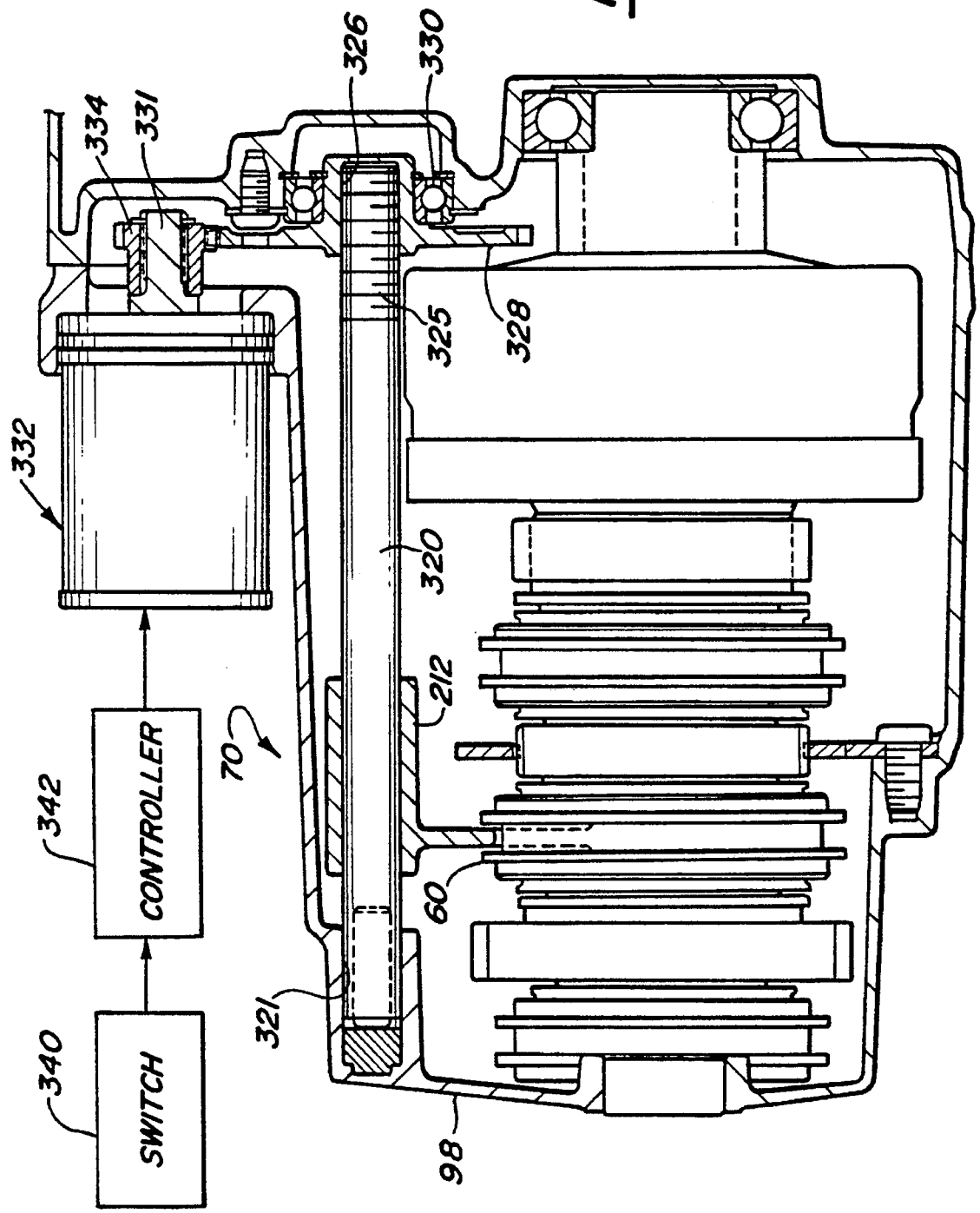

|  | CLUTCH | CLUTCH 2 | CLUTCH 3 | BRAKE 1 | BRAKE 2 | RATIO |
|---|---|---|---|---|---|---|
| 1ST-SPEED | X |  |  |  | X | 3.54 |
| 2ND-SPEED | X |  |  | X |  | 2.01 |
| 3RD-SPEED | X | X |  |  |  | 1.35 |
| 4TH-SPEED | X |  | X |  |  | 1.00* |
| 5TH-SPEED |  | X | X |  |  | 0.76 |
| 6TH-SPEED |  |  | X | X |  | 0.60 |
| PARK |  |  |  | X | X | --- |
| REVERSE |  | X |  |  | X | -2.80 |

Fig-13

(* RECONSTRUCTED FROM RATIOS 1.35 AND 0.86 SHOWN IN FIGURE 10)

MULTI-SPEED MANUAL TRANSMISSION WITH TWO SIMPLE PLANETARY GEARSETS

BACKGROUND OF THE INVENTION

The present invention relates generally to manual transmissions for motor vehicles. More particularly, the present invention relates to a multi-speed manual transmission having a double planetary gearset consisting of two simple planetary gearsets.

As is known, manual transmissions are used in motor vehicles for transmitting engine torque to the drive wheels at various speed ratios. Modernly, most manual transmissions are available in four-speed and five-speed versions since each is particularly well-suited for vehicles equipped with smaller engines. Regardless of the number of available speed ratios, the vast majority of conventional manual transmissions are of the "layshaft" type and include: an input shaft driven by the engine and having a first set of gears supported thereon; an output shaft interconnected to the drive wheels; a countershaft coupled to the output shaft and having a second set of gears supported thereon that are in constant mesh with the first set of gears; and a set of synchronizer clutches for selectively coupling one of the meshed gear pairs for transferring power through the countershaft to the output shaft at a desired gear ratio. However, while this arrangement is typically suitable for most four-speed and five-speed manual transmissions, its application to transmissions having more than five gear ratios is severely limited because of packaging constraints and the complexity of the shift system.

A problem to be addressed with compound layshaft-type transmissions having greater than five speed ratios is commonly referred to as "swap shifting", that is, where two engaged elements are released and two others become simultaneously engaged to establish a desired gear change. This arrangement is highly characteristic of heavy duty truck transmissions in which multiple speed ratios (i.e., eight, nine or fifteen speed ratios) are required. At one time, truck transmissions were equipped with two shift levers for permitting the operator to shift through all the available speed ratios. In particular, a first shift lever was used to shift a torque splitter device while a second lever was used to shift the main gearbox. This system has been modified so that today it is very common to find trucks fitted with a two-speed splitter (high range and low range) that is either hydraulically or electronically shifted.

In an effort to overcome the above-noted difficulties associated with manual layshaft transmissions, one or more planetary gearsets have been incorporated into the geartrain to provide gear shifts with only single shifting steps. While it is known to incorporate a single planetary gear assembly into a vehicle drivetrain (see, for example, U.S. Pat. No. 5,284,068 issued Feb. 8, 1994 to Frost for TRANSFER CASE WITH INTEGRATED PLANETARY GEAR ASSEMBLY and commonly assigned to the assignee of the present application) and even to incorporate a dual planetary gear assembly (see, for example, U.S. Pat. No. 4,836,053 issued Jun. 6, 1989 to Eastman and Jagani for TRANSFER CASE WITH DUAL PLANETARY GEAR REDUCTION UNIT and also commonly assigned to the assignee of the present application), the use of two simple planetary gearsets in a vehicular multi-speed transmission is an area that is relatively unexplored. One application of this combination is shown in U.S. Pat. No. 4,638,688, issued on Jan. 27, 1987, to Hiraiwa and entitled PLANETARY GEAR TRAIN FOR AUTOMOTIVE TRANSMISSION OR THE LIKE. In general, this patent is directed to a geartrain for an automotive transmission that includes two simple planetary gearsets that are operatively controlled by four clutches and two brakes. Thus, while representing an improvement over conventional layshaft arrangements, this transmission is still overly complex, expensive to manufacture, and risks the loss of considerable power between the clutching and braking operations.

SUMMARY OF THE INVENTION

Accordingly, it is an object of the present invention to provide an improved multi-speed transmission for a motor vehicle that incorporates an input shaft, a mainshaft, and an output shaft and associated sliding synchronizer clutches in combination with a double planetary gearset consisting of two simple planetary gearsets.

It is a further object of the present invention to provide such a transmission having split path characteristics.

It is another object of the present invention to provide an improved multi-speed manual transmission for an automotive vehicle which is designed to efficiently and practically transmit engine rotation and power to the drive wheels of the vehicle at various-speed ratios.

It is yet another object of the present invention to provide an improved multi-speed manual transmission for an automotive vehicle in which only a single element is changed at each gear changing interval.

It is still another object of the present invention to provide an improved multi-speed manual transmission that replaces the large gear ratio steps associated with known multi-speed layshaft transmissions with small steps at high speed ratios and progressively larger steps at lower speed ratios.

Accordingly, the present invention is directed to a multi-speed transmission equipped with a double planetary gearset consisting of two simple planetary gearsets. The transmission also includes input and output shafts rotatably connected by constant-mesh gearwheels. This construction provides two fixed speed ratios and two power transmission routes. The first power transmission route uses the first fixed speed ratio and the second power transmission route uses the second fixed speed ratio. The first fixed speed ratio is lower than the second fixed speed ratio. The first power transmission route is established through controlled actuation of first and second sliding synchronizer clutches and the rotary members of the double planetary gearset. The second power transmission route is established through controlled actuation of a third sliding synchronizer clutch and the rotary members of the double planetary gearset. In addition, the first and second power transmission routes share a common control brake engaged by selective movement of the second sliding synchronizer clutch and the third sliding synchronizer clutch.

In a preferred form, the manual transmission of the present invention provides six forward speeds in addition to a braked neutral and a reverse drive. Moreover, the manual transmission of the present invention finds application in either front-wheel drive (FWD) or rear-wheel drive (RWD) vehicles.

BRIEF DESCRIPTION OF THE DRAWINGS

The above-noted and other advantages of the present invention will become apparent to one skilled in the art by reading the following specification and subjoined claims in conjunction with reference to the following drawings in which:

FIG. 7 is a partial sectional view of the six-speed transmission shown in FIG. 6 illustrating the shift control system in greater detail;

FIG. 13 is a chart summarizing the engagement of the various clutches and brakes to produce the various gears of the present invention.

DETAILED DESCRIPTION OF THE PREFERRED EMBODIMENTS

Figure 1:
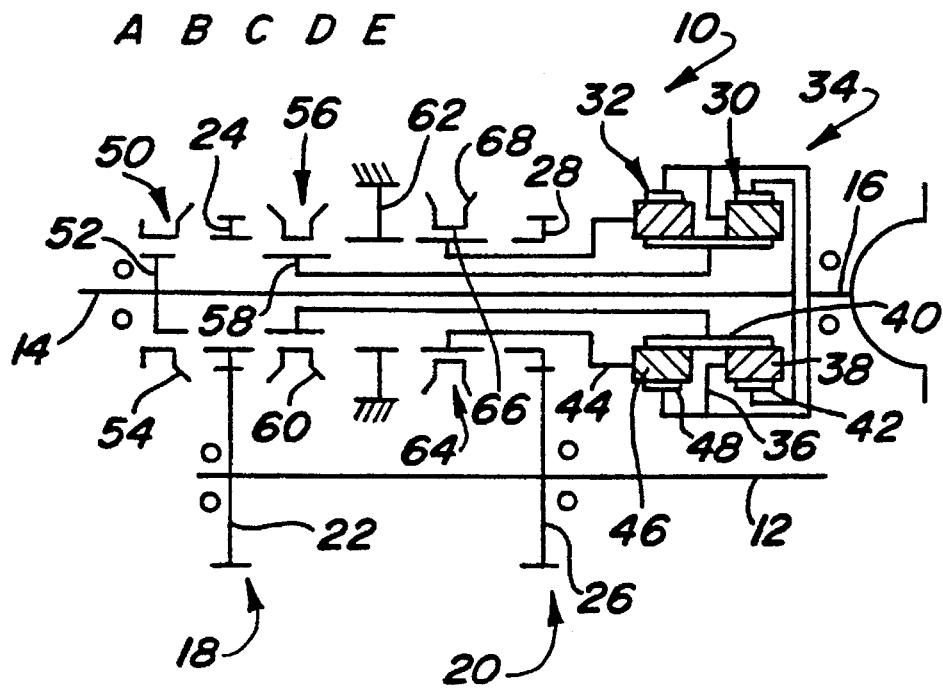
FIG. 1 shows, in schematic form, a double planetary geartrain for a multi-speed transmission according to the present invention.

In general, the present invention is directed to a multi-speed manual transmission of the type used in motor vehicles and which is equipped with a planetary geartrain that includes a double planetary gearset consisting of two simple planetary gearsets. As will be understood, the novel geartrain to be disclosed hereinafter is shown in a merely exemplary transmission application to which modifications can be made. As will be set forth, FIG. 1 schematically illustrates a double planetary geartrain 10 for use in six-speed transmissions. However, while six-speed transmissions represents the preferred embodiment, a five-speed transmission may be easily derived by simple modifications to geartrain 10.

As noted, the present invention is directed to a multi-speed transmission having a geartrain 10 comprised of an input shaft 12 driven by the engine (not shown) through engagement of a manually-operable clutch (not shown), a mainshaft 14, and an output shaft 16. Power is delivered from input shaft 12 to mainshaft 14 through a pair of gearsets 18 and 20. First gearset 18 includes a first input gear 22 that is fixed to input shaft 12 and a first drive gear 24 that is rotatably mounted on mainshaft 14. First input gear 22 and first drive gear 24 are in constant mesh so as to define a first power transmission route having a first speed ratio. Second gearset 20 includes a second input gear 26 that is fixed to input shaft 12 and a second drive gear 28 that is rotatably mounted on mainshaft 14. Similarly, second input gear 26 and second drive gear 28 are in constant mesh so as to define a second power transmission route having a second speed ratio. Preferably, first input gear 22 has a diameter smaller than that,of second input gear 26, whereas first drive gear 24 has a diameter larger than that of second drive gear 28. Accordingly, the second speed ratio is higher than the first speed ratio.

A first three-member simple planetary gearset 30 and a second three-member simple planetary gearset 32 are provided and are collectively referred to as a double planetary gearset 34. First planetary gearset 30 includes a carrier 36 journally carrying a plurality of pinions 38 which, in turn, are each meshed with a sun gear 40 and a ring gear 42. Similarly, second planetary gearset 32 has a carrier 44 journally carrying a plurality of pinions 46 which, in turn, each mesh with sun gear 40 and a ring gear 48.

Figure 2:
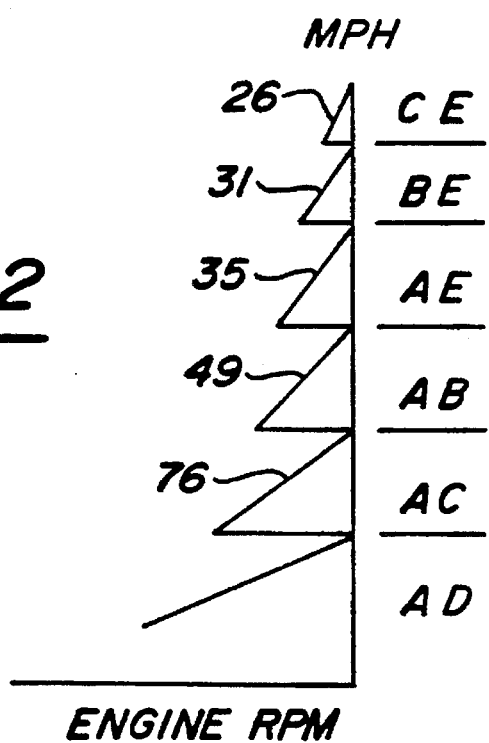
FIG. 2 shows a coordinate graph of the steps between gear ratios of the double planetary geartrain shown in FIG. 1 with engine revolutions-per-minute indicated along the horizontal axis and vehicle speed indicated along the vertical axis.

With reference to FIG. 2, a graph of the "graduated" steps between adjacent gear ratios provided by geartrain 10 of FIG. 1 is illustrated. The axes are oriented by reference to a planar Cartesian coordinate system with engine speed being indicated along the horizontal axis and vehicle speed being indicated along the vertical axis. This figure illustrates the inherent advantage of planetary arrangements over conventional layshaft arrangements in that at high ratios the shift points are graduated with smaller steps, with the steps becoming progressively larger with each downshift.

The following discussion is made with reference to both FIGS. 1 and 2. A first synchronizer clutch 50 is shown to include a hub 52 fixed for rotation with mainshaft 14, and a clutch sleeve 54 that is supported for axial sliding movement on and rotation with hub 52. As seen, first synchronizer clutch 50 is adapted to selectively couple first gearset 18 to mainshaft 14. In particular, first clutch 50 is a unidirectional clutch such that aft movement of clutch sleeve 54 results in meshed engagement with first drive gear 24, as denoted by position "A". A second synchronizer clutch 56 is shown to include a hub 58 fixed for rotation with sun gear 40. Second synchronizer clutch 56 also includes a clutch sleeve 60 that is supported for rotation with and bi-directional axial movement on hub 58. When clutch sleeve 60 is moved to its forward position, as denoted by position "B", it couples first gearset 18 to sun gear 40. Conversely, when clutch sleeve 60 is moved to its aft position, as denoted by position "C", it is coupled with a stationary brake 62 for braking sun gear 40 against rotation. In either case, rotary power is delivered from input shaft 12 to double planetary gearset 34 for subsequent delivery to output shaft 16.

A third synchronizer clutch 64 is also provided and includes a hub 66 fixed for rotation with planet carrier 44 of second planetary gearset 32, and a clutch sleeve 68 supported for rotation with and bi-directional axial movement on hub 66. Thus, when clutch sleeve 68 is moved to its forward position, as denoted by position "D", it is engaged with brake 62 so as to brake planet carrier 44 against rotation. Alternatively, when clutch sleeve 68 is moved to its aft position, as denoted by position "E", second gearset 20 is coupled to carrier 44 of second planetary gearset 32.

FIG. 2 illustrates how the present invention eliminates "swap shifting" by providing a shift arrangement in which only one of the elements is released at any given time, thus eliminating the unsmooth shifting associated with swap shifting-style transmissions.

Figure 3:
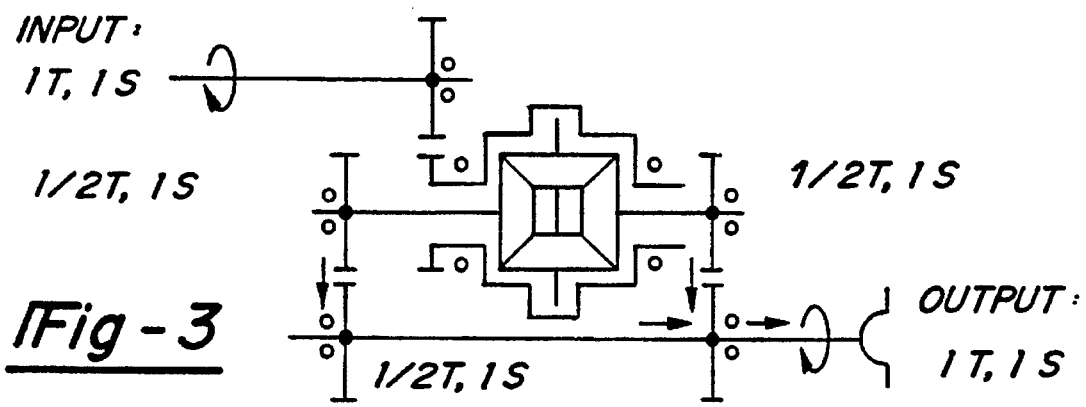
FIG. 3 is a schematic form of a known split path differential arrangement.

Another feature of the present invention relates to the splitting of the power path. As is known, planetary arrangements conventionally have three elements, one element being an input, one element being an output, and the third being linked to ground to give the fixed ratio. However, if the third element is linked to either the input or the output instead of being linked to ground, then power is split into two paths and the "free body" elements control torque ratios, while the numbers of gear teeth control speeds. For example, a conventional differential, shown in FIG. 3, is equivalent to a planetary having "free body" elements. The side gear torques are equal and the sum of both side gear torques equal the carrier torque. Accordingly, the carrier is being driven with a single torque and a single speed. The torque is split 50—50 between the side gears of the differential such that each gear is rotating at the same speed as the other but with only half the total input torque.

Figure 4:
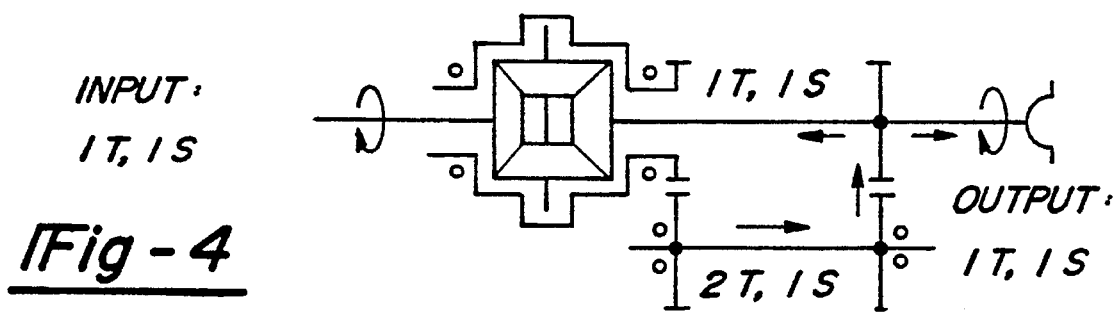
FIG. 4 is a schematic form of another known split path differential arrangement.

Taking the planetary-differential analogy still further, an alternate differential is shown in FIG. 4. Unlike the differential of FIG. 3, power is shown entering on the side gear at one torque and one speed. According to the "free body" analysis, the side gear of the differential has one torque being applied against it, and, by an extension of this analysis, the opposing side gear must also have one torque being applied against it. This being the case, with one torque on the first side gear and with one torque on the other side gear, the sum on the carrier is two, or torque X 2, and the torque is being delivered with still one speed. At the output juncture the power is again split with one torque and a single speed as the output. But, and as illustrated, at a certain point the differential produces two torque and a single speed (which is in actuality twice the horsepower as the input).

Figure 5:
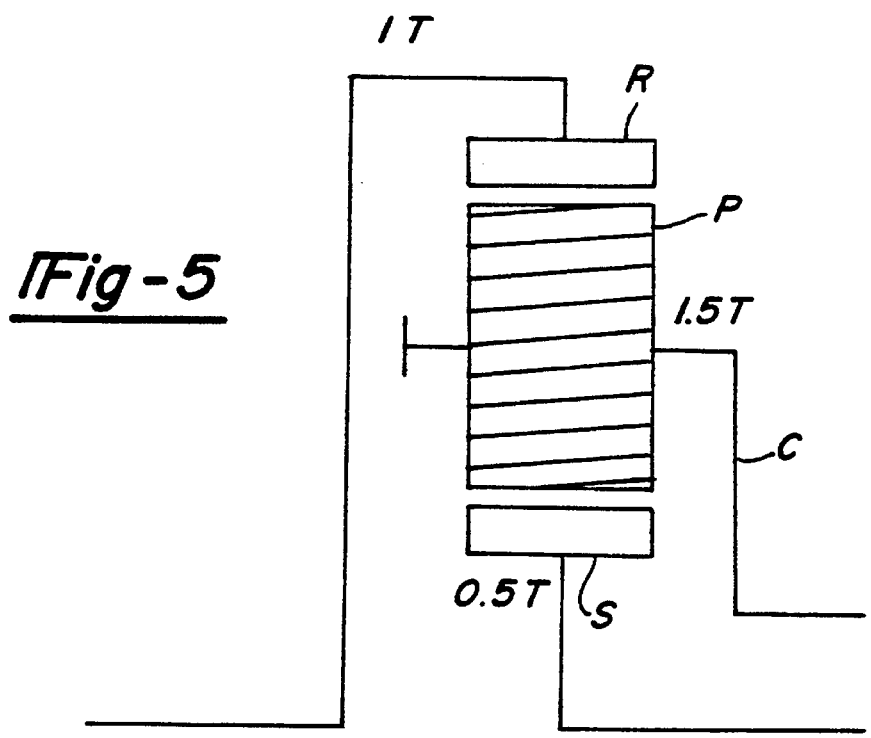
FIG. 5 is a schematic illustrating split path operation in a planetary arrangement.

While the layouts of FIGS. 3 and 4 relate to planetaries and not to differentials, the split path principle of the present invention is substantially the same, and may be applied to planetary systems, as illustrated in FIG. 5. An input having a torque of, for example, 1.5 T, is divided or split in the geartrain such that, again by way of example, an input torque of 1T is provided to the planet gear P through the ring gear R, while an input torque of 0.5 T may be provided to the planet gear P by the sun gear S. As a result, the planet gear P produces in the carrier C an output torque of 1.5 T. The present invention embodies the split path construction, and a preferred construction is described hereafter.

Figure 6:
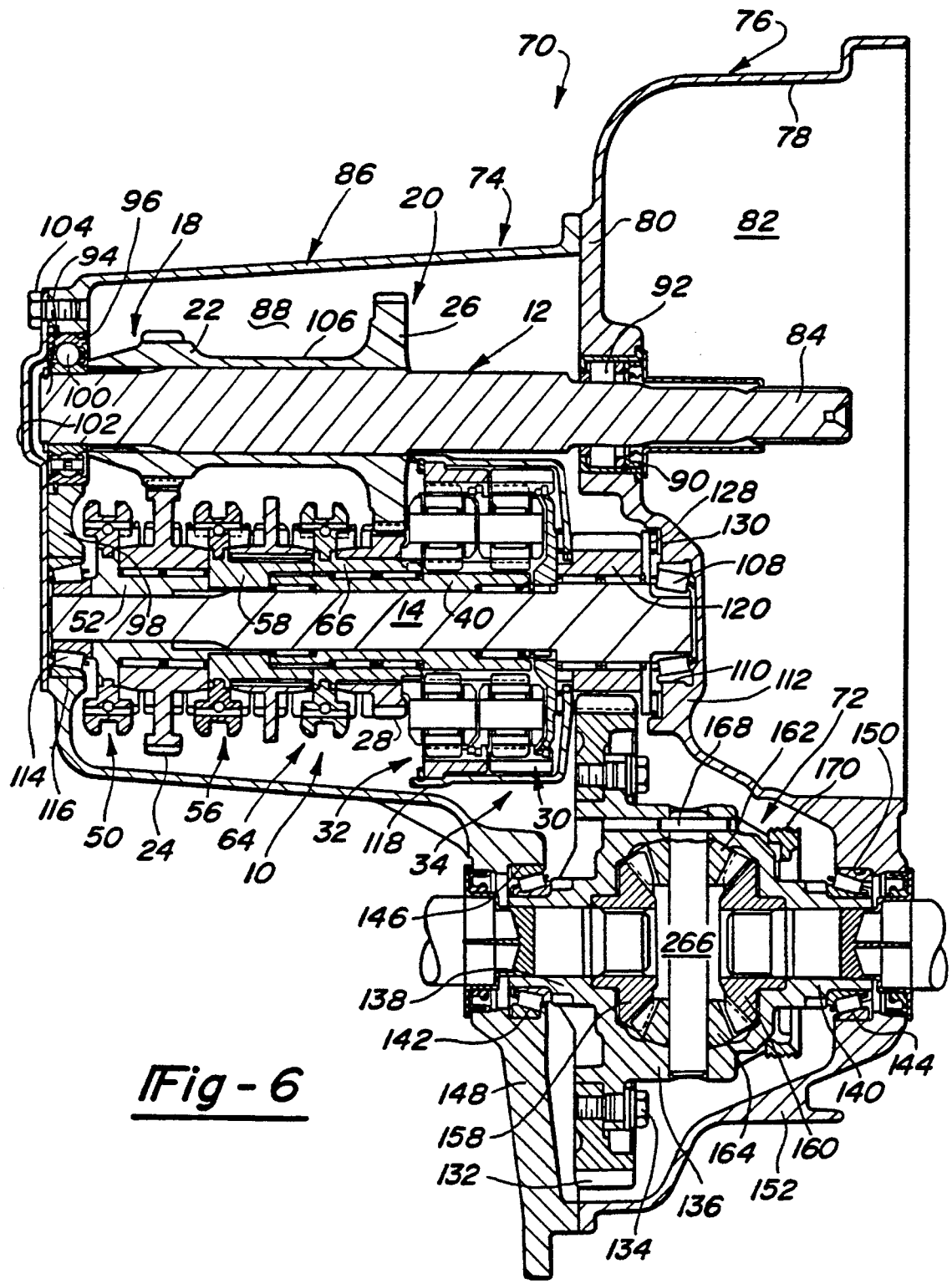
FIG. 6 is a sectional view of a six speed manual transmission equipped with the double planetary gearset consisting of two planetary gearsets according to the present invention and which is adapted for front-wheel drive applications.
Figure 6A:
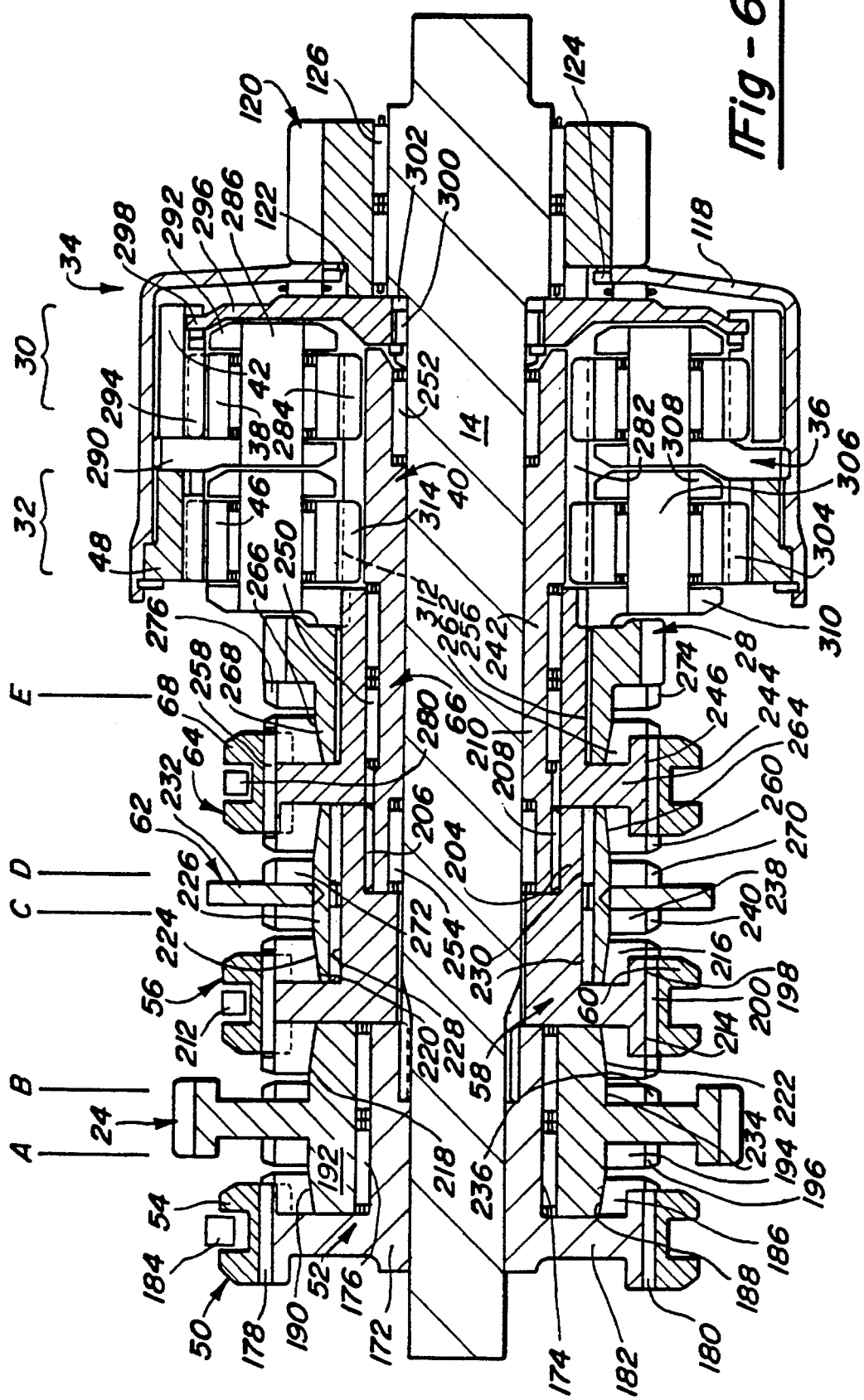
FIG. 6A is an enlarged portion of the sectional view shown in FIG. 6 illustrating the double planetary geartrain of the present invention in greater detail.

With particular reference to FIGS. 6 and 6A, sectional views of a six-speed manual transmission 70 constructed according to a preferred embodiment of the present invention are provided. In general, this embodiment finds particular application in front-wheel drive, transverse mounted engine vehicles. More specifically, transmission 70 is a "transaxle" having the output of geartrain 10 coupled to a differential 72, both of which are mounted in a housing assembly 74. Housing assembly 74 includes a clutch casing 76 defining a bell housing portion 78 and an intermediate wall portion 80 which define a clutch chamber 82. As is conventional, a releasable clutch (not shown) is housed in bell housing 78 and coupled to end 84 of input shaft 12. Housing assembly 74 also includes a transmission casing 86 that is secured to clutch casing 76 to define an enlarged chamber 88 in which geartrain 10 and differential 72 are mounted.

As best seen from FIG. 6, end 84 of input shaft 12 extends through an aperture 90 formed through intermediate wall portion 80 and is rotatably supported therein by a suitable bearing assembly 92. The opposite end 94 of input shaft 12 extends through an aperture 96 in an end wall 98 of transmission casing 86 and is likewise supported for rotation therein by a suitable bearing assembly 100. Aperture 96 is enclosed by a cover plate 102 that is secured to end wall 98 via bolts 104. As seen, input gears 22 and 26 are formed on an input stubshaft 106 that is suitably fixed (i.e., splined) to input shaft 12 for rotation therewith. Obviously, input gears 22 and 26 could have been formed integrally on input shaft 12.

As previously noted, mainshaft 14 and/or double planetary gearset 34 are operatively arranged to transfer engine torque from input shaft 12 to output shaft 16. Mainshaft 14 is rotatably supported at its output end (or aft end) by a suitable bearing assembly 108. Bearing assembly 108 is fixed in a piloted recess 110 formed in an offset wall segment 112 of intermediate wall portion 80. Likewise, mainshaft 14 is supported at its forward end by a suitable bearing assembly 114 that is retained in an aperture 116 formed in end wall 98 and which is also enclosed by cover plate 102.

The double planetary gearset 34 is supported on mainshaft 14 with its output member shown to include a cylindrical drum 118 that is fixed to an output gear 120. In particularly, drum 118 includes a central bore having internal splines 122 that are meshed with a set of external splines 124 formed on output gear 120. Moreover, output gear 120 is rotatably supported on the aft end of mainshaft 14 by sets of needle bearings 126. Between the aft end of output gear 120 and the portion of intermediate wall portion 80 surrounding piloted recess 110 are a plurality of needle bearings 128 that are separated from output gear 120 by a suitable thrust washer 130.

In general, output gear 120 is coupled to differential 72 for transferring engine torque thereto. In particular, output gear 120 directly drives a differential gear 132 that is secured by fasteners 134 to a differential cage 136. Cage 136 includes a pair of axial sleeves 138 and 140 that are rotatably supported in housing assembly 74 by bearing assemblies 142 and 144, respectively. Bearing assemblies 142 and 144 are respectively mounted and secured in an aperture 146 formed through a differential housing portion 148 of transmission casing 86, and in an aperture 150 formed in a differential housing portion 152 of clutch casing 76.

In the transaxle disclosed, output shaft 16 comprises output gear 120, differential 72, and a pair of axle half-shafts 154 and 156 which are rotatably journalled in sleeves 138 and 140, respectively, and fixed (i.e., splined) to bevelled side gears 158 and 160, respectively. Side gears 158 and 160 both mesh with a pair of differential pinions 162 and 164, both of which are mounted on an elongated cross shaft 166 which, in turn, is secured to differential cage 136 by a pin 168. Finally, a speedometer gear 170 is shown fixed to cage 136.

According to the construction set forth in FIGS. 6 and 6A, hub 52 of first synchronizer clutch 50 is fixed by splines to mainshaft 14 for rotation therewith. Hub 52 has a tubular axial segment 172 defining an external roller surface 174 upon which first drive gear 24 is rotatably supported via a suitable bearing arrangement 176. First synchronizer clutch 50 is a single-cone synchronizer and clutch sleeve 54 has internal splines 178 meshed with external splines 180 formed on a radial segment 182 of hub 52 such that clutch sleeve 54 is rotatably driven by hub 52 in response to rotation of mainshaft 14. As is conventional, clutch sleeve 54 is also axially movable from the centered position shown toward position "A" by means of a shift fork, partially shown at 184, that is attached to a shift rail (not shown). First synchronizer clutch 50 also includes a blocker ring 186 having an internal friction surface 188 adapted to contact a first external cone surface 190 formed on an axial hub 192 of first drive gear 24. A clutch member 194 is fixed to axial hub 192 and has clutch teeth 196 that are selectively engaged by internal splines 178 of clutch sleeve 54 when clutch sleeve 54 is moved to position "A" for coupling first gearset 18 to mainshaft 14. It will be noted that friction surface 188 may include a friction pad or lining bonded or cemented to its conical surface for providing effective frictional engagement. While not significant to the novelty of the present invention, it is preferred that first synchronizer clutch 50 be of a "strut-type" having a plurality of circumferentially-spaced struts and springs supported from slots formed in radial segment 182 of hub 52.

Second synchronizer clutch 56 is also a single-cone arrangement with clutch sleeve 60 having internal splines 198 meshed with external splines 200 formed on a radial extension 202 of hub 58 for rotation therewith. In addition, hub 58 includes an axial extension 204 that is partially journalled on mainshaft 14 and on which internal splines 206 are formed for meshed engagement with external splines 208 on a stub shaft segment 210 of sun gear 40. Clutch sleeve 60 is axially movable in between its "B" and "C" positions by means of a second shift fork 212 that is attached to a second shift rail (not shown). Second synchronizer clutch 56 also includes a pair of fore and aft (i.e., left and right) blocker rings 214 and 216 that respectively include internal conical surfaces 218 and 220, each preferably friction lined, that are adapted to contact external cone surfaces 222 and 224 that are respectively formed on a second side of hub 192 on gear 24 and a brake cone 226 associated with brake 62. Brake cone 226 is a tubular component that is supported on an outer rolling surface 228 of axial hub extension 204 via suitable bearings 230. A plate-like support 232 is fixed (i.e., splined) to brake cone 226 and is also fixed to transmission casing 86, whereby brake cone 226 is held stationary at all times. As seen, a clutch element 234 is fixed to gear hub 192 and has clutch teeth 236 that are selectively engageable with splines 200 on clutch sleeve 60 when, upon synchronization, clutch sleeve 60 is moved to its "B" position for coupling first gearset 18 to hub 58 and, in turn, sun gear 40. A third clutch element 238 having clutch teeth 240 is shown fixed on brake cone 226 for coupling hub 58 to brake 62 when, upon synchronization, clutch sleeve 60 is moved to its "C" position, whereby sun gear 40 is braked against rotation.

Third synchronizer clutch 64 includes hub 66 that is rotatably mounted on sun gear stub shaft 210 which, in turn, is rotatably mounted on mainshaft 14. As seen, hub 66 has an axial segment 242 and a radial segment 244 on which external spline teeth 246 are formed. Axial segment 242 of hub 66 and sun gear stub shaft 210 are separated by sets of needle bearings 250, while sun gear stub shaft 210 is supported for rotation relative to mainshaft 14 by a pair of laterally-spaced bearing assemblies 252 and 254. In addition, second drive gear 28 is journally supported from axial segment 242 of hub 66 via a bushing 256.

Third synchronizer clutch 64 is also a single-cone arrangement wherein clutch sleeve 68 has internal splines 258 meshed for rotation and axial movement on splines 246 of hub 66. Third synchronizer clutch 64 also includes a pair of fore and aft (i.e., left and right) blocker rings 260 and 262 that each include an internal friction surface adapted to contact external cone surfaces 264 and 266, respectively, formed on brake cone 226 and on a flange 268 integral with gear 28. Clutch sleeve 68 may selectively engage either teeth 270 of a clutch element 272 fixed to brake cone 226 (position "D") or teeth 274 of a clutch element 276 fixed to flange 268 (position "E"). In either case, such movement of clutch sleeve 68 is provided by movement of a shift fork 280 that is fixed to a third shift rail (not shown).

As discussed above, a primary feature of the present invention is the inclusion of double planetary gearset 34. As briefly noted above, double planetary gearset 34 includes a pair of three-member planetary gearsets 30 and 32, each having a common sun gear 40. With respect to the first planetary gearset 30, teeth 282 of sun gear 40 are meshed with teeth 284 of planet pinions 38. Each planet pinion 38 is rotatably journalled on a pin 286 that is supported between carrier rings 290 and 292, suitably interconnected as by machine bolts (not shown). In addition, teeth 284 of pinions 38 also mesh with teeth 294 of ring gear 42. A drive plate 296 couples ring gear 42 to mainshaft 14. In particular, outer peripheral splines 298 on drive plate 296 mesh with ring gear teeth 294 while its inner peripheral splines 300 mesh with splines 302 on mainshaft 14. As is also apparent, forward carrier ring 290 is coupled (i.e., splined) to output drum 118.

With respect next to second planetary gearset 32, teeth 282 of sun gear 40 are meshed with teeth 304 of planet pinions 46. Moreover, each pinion 46 is rotatably journalled on a pin 306 between carrier rings 308 and 310, suitably interconnected by machine bolts (not shown). In addition, forward carrier ring 310 has internal splines 312 that are in constant mesh with splines 314 formed on axial segment 242 of hub 66.

FIG. 7 is a view of six-speed transmission 70 of the present invention which illustrates a system for electronically shifting each of the shift sleeves of the synchronizer clutches. This view is exemplary of the preferred method, although other systems may be employed. As will be appreciated, each synchronizer clutch sleeve, is selectively shiftable through coaxial movement of its respective shift fork. In the case of second synchronizer 64 shown in FIG. 7, shift fork 212 is fixed to an axially movable shift rail 320. Rail 320 is slidingly supported at one end in a smooth bore 321 defined in end wall 98. The other end of rail 320 has external threads 325 threaded into the internal threads 326 of a driven gear 328 that is rotatably mounted within a bearing set 330. The rotary output 331 of a servo motor 332 is coupled to a driving gear 334 that meshingly engages driven gear 328. Servo motor 332 need only be a simple motor that is capable of producing a relatively high number of revolutions per minute. As should be understood, because of the high revolutions-per-minute character of servo motor 332, axial movement of shift fork 212 required for moving clutch sleeve 60 is easily accomplished in only a small amount of time. An input signal sent by a transmission shift switch 340 indicating movement of a gear shift lever to the desired gear ratio position is sent to our electronic controller 342. Controller 342 is operable to control actuation (i.e., direction of rotation of rotary output 331) of servo motor 332 and the other servo motors associated with movement of clutch sleeves 54 and 68. Preferably, synchronizer clutches 50 and 64 would be actuated by dedicated servo motors (not shown), although the driving servo units and their related shift forks and rails would be arrayed about the transmission shafts in such a way so as to avoid interference with one another. As an alternative to this system, any suitable mechanical shift system can be used.

In the Example below, transmission gear ratios associated with transmission 70, as established by geartrain 10, are shown in table form.

EXAMPLE

| Gears | Transmission Ratios | Steps |
|---|---|---|
| 1st | 3.54 | |
| | | 76 |
| 2nd | 2.01 | |
| | | 49 |
| 3rd | 1.35 | |
| | | 35 |
| 4th | 1.00* | |
| | | 31 |
| 5th | 0.76 | |
| | | 26 |
| 6th | 0.60 | |
| REVERSE | −2.80 | |

(*The preferred embodiment, described below, does not actually have a true 1:1 throughput ratio. The 1.35 and 0.85 [see FIG. 10] reconstruct this ratio.)

The listed transmission gear ratios produce small differential (%) steps at high ratios and progressively larger steps at lower ratios. These gear ratios are suggested and are only set forth as preferred ratios, and are not intended to be limiting. To this end, modification of gear sizes, teeth, etc., could be made within a reasonable range to provide a wide variety of transmission gear ratios, while still obtaining favorable steps between shifts.

With reference now to FIGS. 8, 9, 11, and 12, a modified version of geartrain 10 is shown and designated by reference numeral 10' and which is adapted for use in transmission 70. As can be seen, geartrain 10' includes various modified components that are operably arranged to function in a substantially similar manner to that of geartrain 10. As such, primed numerals are used to designate those components that have been modified. For sake of brevity, only the most significant modifications need to be addressed with any specificity. For instance: gear 24' is now journalled directly from mainshaft 14' on bearings 319; clutch hub 58' is supported from sun gear stub shaft 210'; each clutch member is integrally formed on its respective gears 24' and 28' as well as on brake cone 226'; carrier ring 310' includes an axial extension 322 on which clutch hub 66' is splined; carrier ring 290' is now an integral segment of drive drum 118'; and output drive gear 120' has drive plate 296' coupled to drive drum 118'. Again, it should be understood that such modifications are merely equivalent alternatives to that originally disclosed.

FIGS. 8, 9, 11, and 12 illustrate the positions of the various synchronizer clutches for establishing the particular gear ratios for each drive mode and further illustrates the power transmission routes taken from input shaft 12' to output gear 120'. As illustrated, engine power is being constantly delivered to drive gears 24' and 28' via input gears 22' and 26', respectively, when the clutch (not shown) is engaged.

Figure 8:
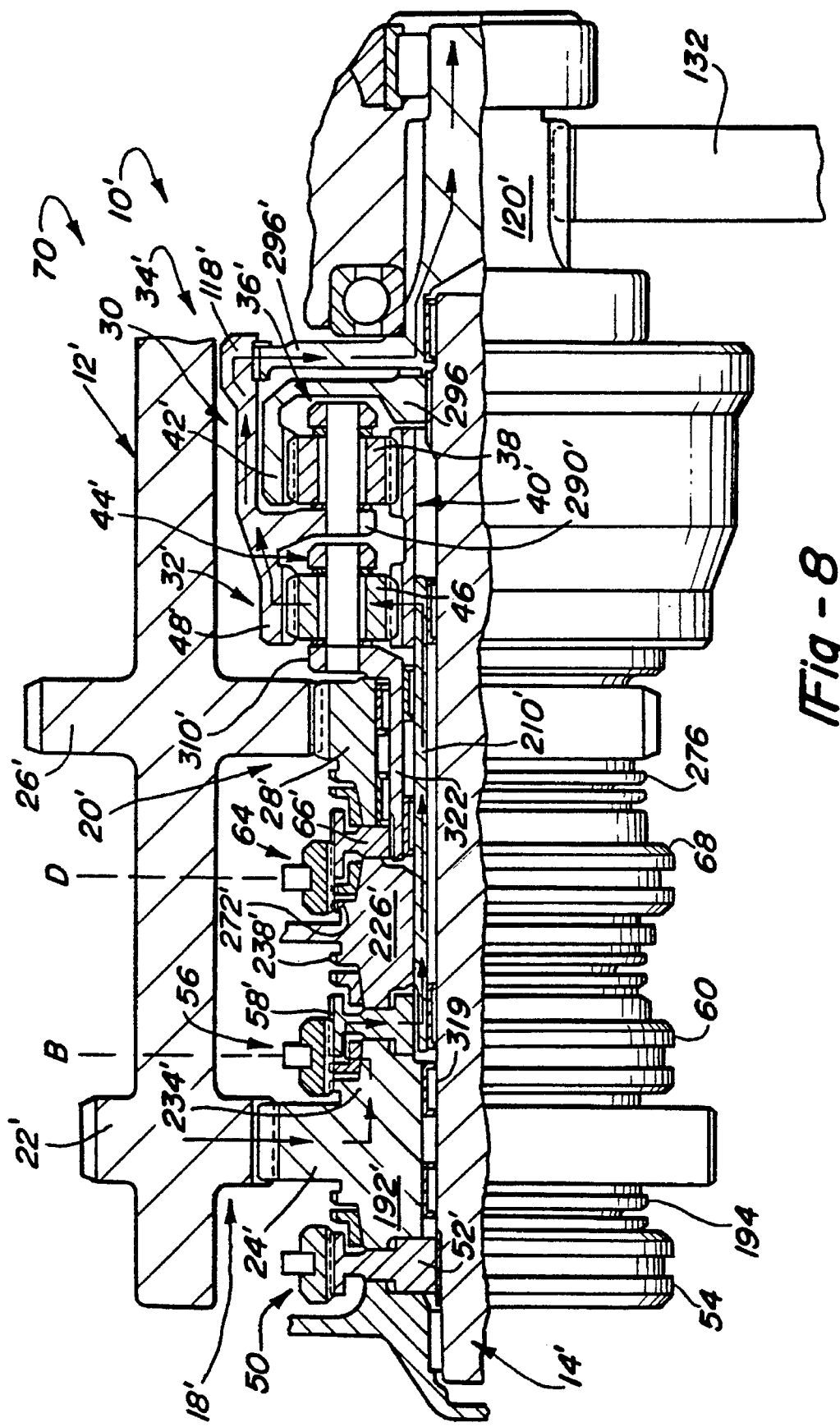
FIG. 8 is an enlarged fragmentary view of an alternative construction for the double planetary geartrain of the present invention and which is shown in its "reverse" drive mode.

With respect to FIG. 8, the clutch positions are illustrated when transmission 70 of the present invention is in the "Reverse" drive mode. Reverse gear is established when second clutch sleeve 60 is positioned in its "B" position to spline hub 58' linking sun gear 40' to first gearset 18'. In addition, third clutch sleeve 68 is positioned in its "D" position for coupling hub 66' to common brake 62', thereby holding carrier 44' of second planetary gearset 32' against rotation. Such an arrangement reverses the rotary direction of the power transmitted from first gearset 18' through double planetary gearset 34' to output gear 120'.

Figure 9:
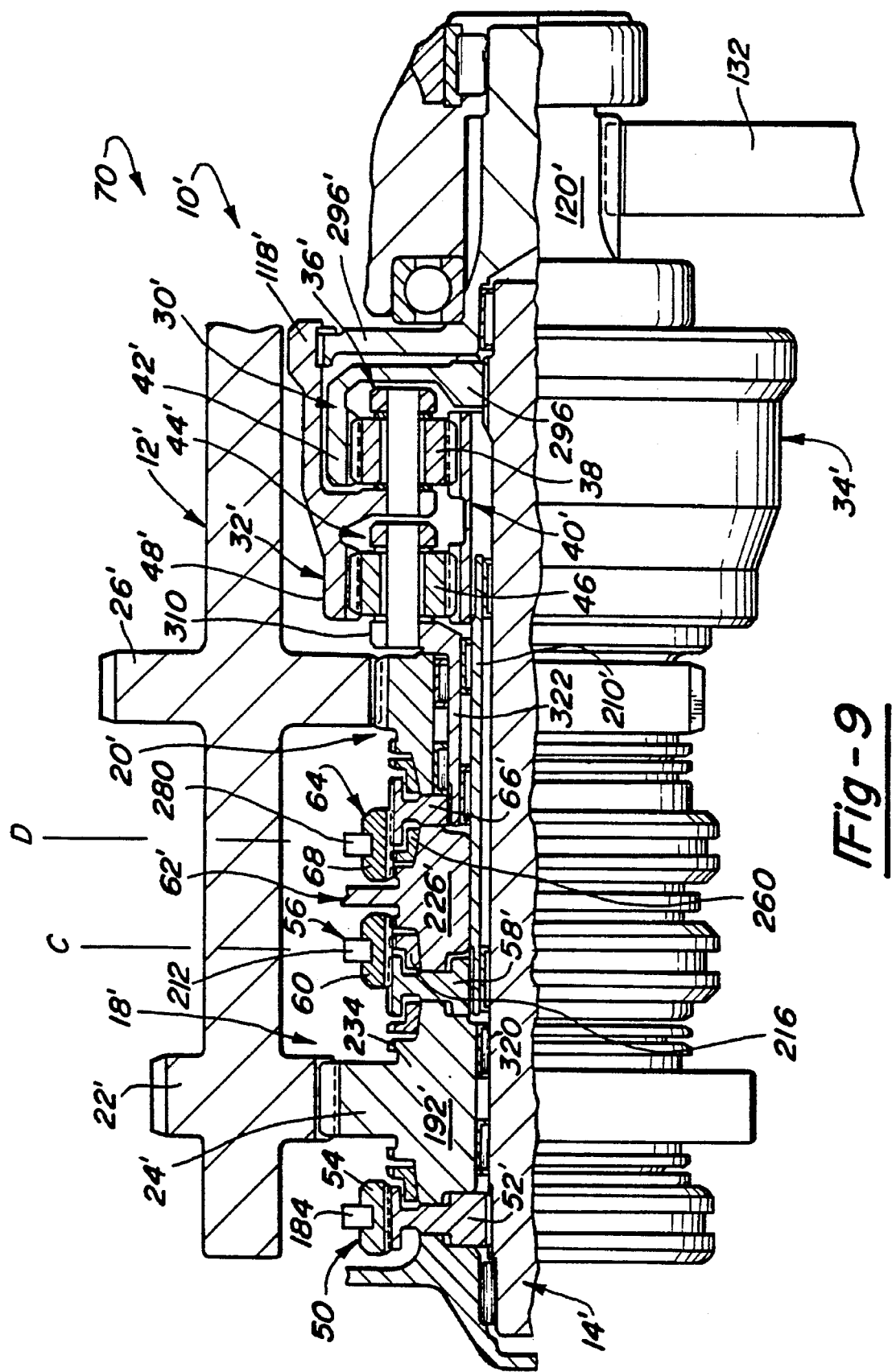
FIG. 9 is a view similar to that of FIG. 8 showing the present double planetary geartrain in its "braked neutral" mode.

With respect to FIG. 9, the clutch positions are illustrated when transmission 70 of the present invention is in its "braked neutral" position. In this position, second clutch sleeve 60 is located in its "C" position for coupling hub 58' with brake 62', thereby locking common sun gear 40' against rotation. At the same time, third clutch sleeve 68 is positioned in its "D" position, thereby also coupling hub 66' to brake 62'. This arrangement holds sun gear 40' and second pinion carrier 44' against rotation. Accordingly, output gear 120 is held from rotation and no power is transmitted through geartrain 10'.

Figure 10:
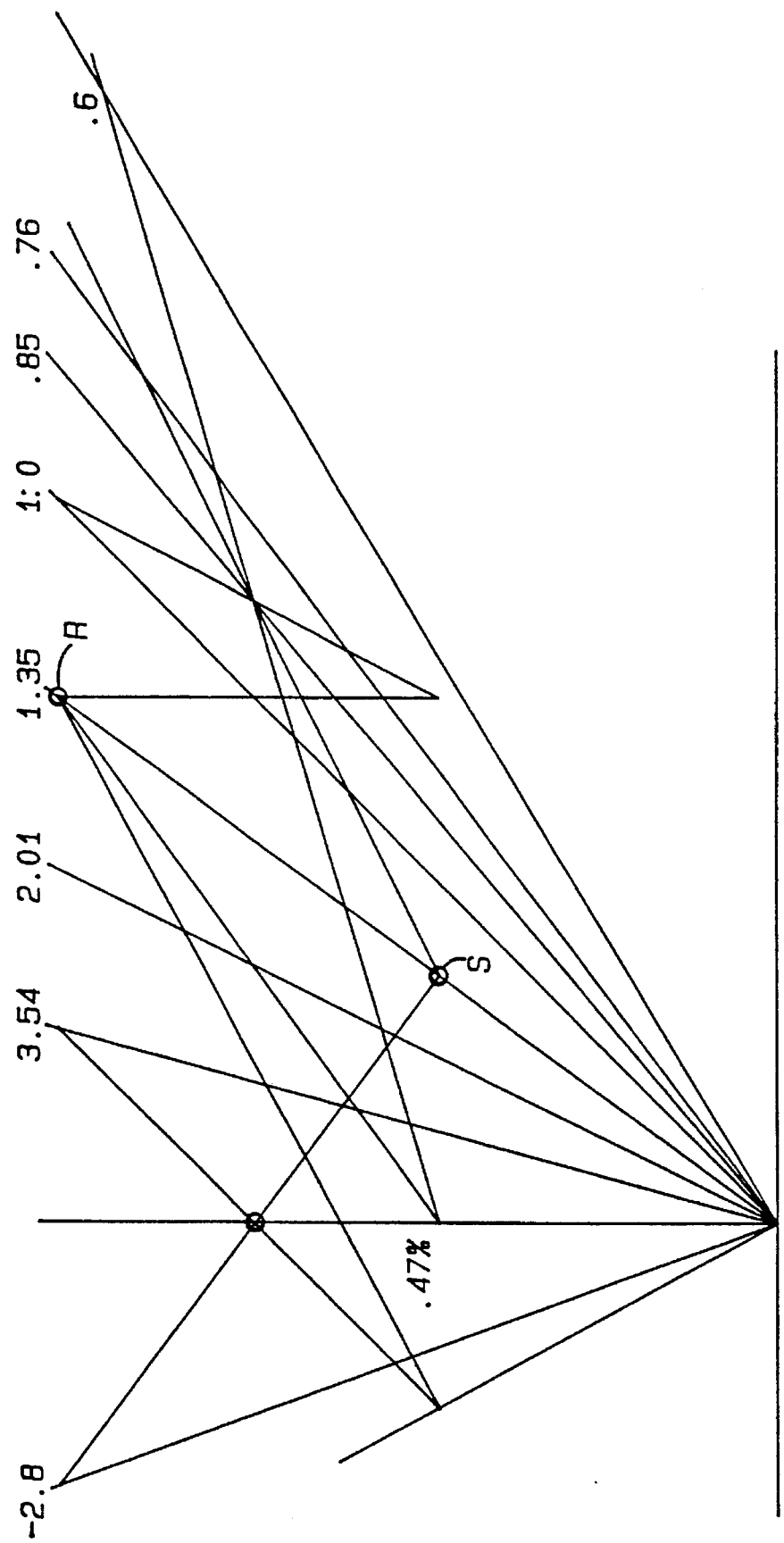
FIG. 10 is a torque-versus-speed graph illustrating numerical relationships between rotation speed ratios of the preferred embodiment of the present invention.

FIG. 10 illustrates a graph showing the numerical relationship between rotation speed ratios of the preferred embodiment of the present invention. The X-axis represents rotational speed and the Y-axis represents torque. The graph illustrates the center of the planetary system with, for example and with reference to the line marked 1.35, "R" representing the ring and "S" representing the sun. Any point halfway between the sun S and the ring R represents the planet. (This type of graph is particularly useful in that the planet would typically be drawn to scale, thus giving the designer the opportunity to readily view the actual size of the actual planet ultimately to be used in the transmission.) The radiating lines represent an instant vector study of what is happening to the X-axis if certain points are held. When magnified further, the lines, in relation to the axes, define the ratio relationships. The line identified as ratio 1:1 is at a 45° angle, assuming the graph is drawn on conventional graph paper.

According to the preferred embodiment, the two support ratios provided by the selected gearsets delivering power from the engine input are 0.85 and 1.35 with a sun-to-ring ratio of 0.47. The illustrated arrangement produces input-to-output speed ratios of 3.54 for first gear, 2.01 for second gear, 1.35 for third gear, 1.00 for fourth gear (reconstructed in the planetary gearset from 1.35 and 0.85), 0.76 for fifth gear, and 0.60 for sixth gear. FIG. 13 is a chart showing the clutch and brake engagement-and-release pattern for the planetary geartrain of the illustrated preferred embodiment of the present invention. Reverse, described above, has a ratio of −2.80. The preferred embodiment incorporates two examples of split path operation, and these are illustrated in FIGS. 11 and 12, with the former being the example of first gear and the latter being the example of fourth gear.

Figure 11:
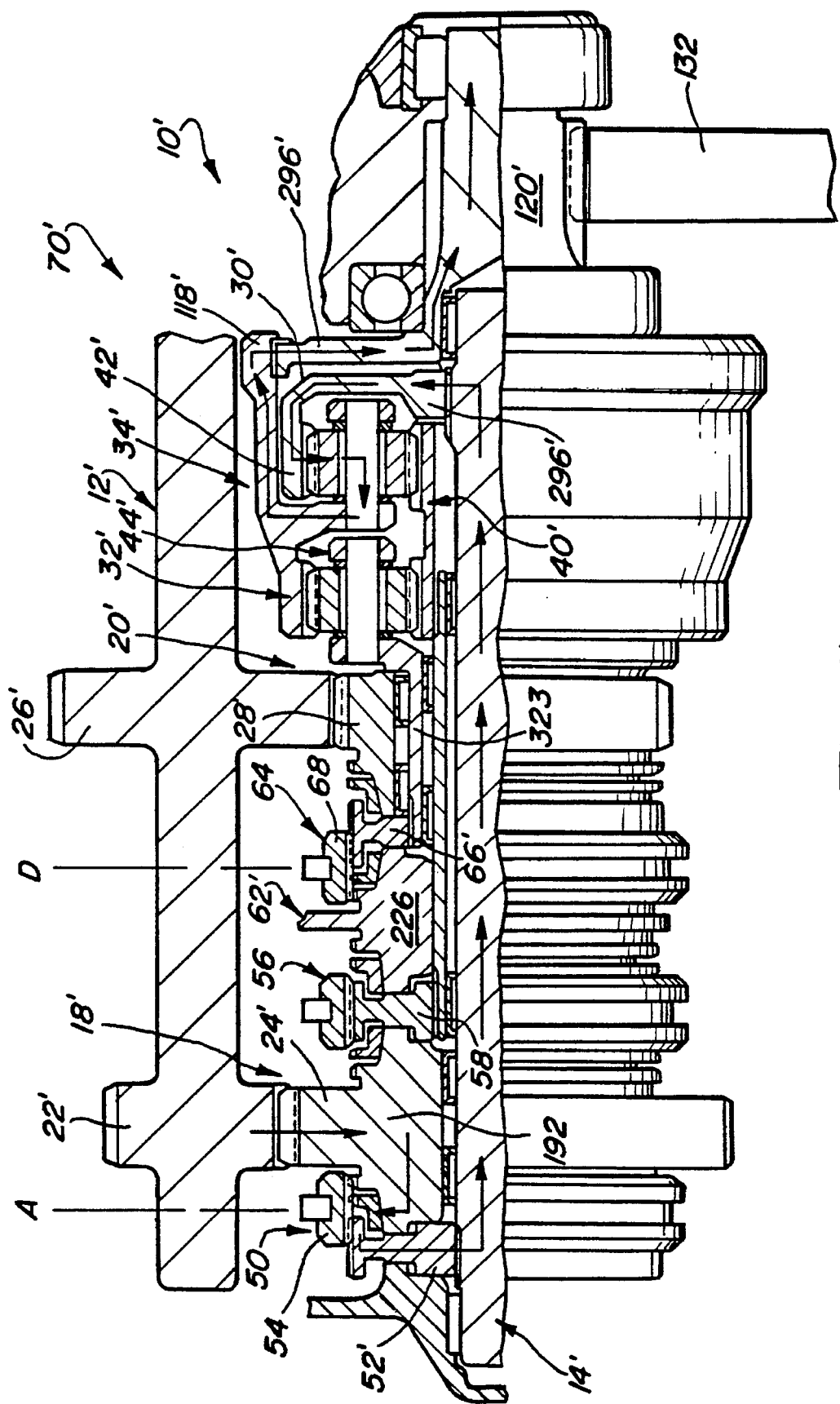
FIG. 11 is a view similar to that of FIG. 8 showing the planetary geartrain in a split path gear mode.

With respect to FIG. 11, the clutch positions are illustrated when the transmission 70 is in its First (1st) forward gear or drive mode. In this gear, the first clutch sleeve 54 is in its "A" position for coupling mainshaft 14' to first gearset 18'. The third clutch sleeve 68 is located in its "D" position, thereby coupling the hub 66' to the brake 62'. Power is transmitted from the power source and the path is split between the source and the double planetary assembly 34', then is recollected in the double planetary assembly 34' to drive output drum 118' and the output gear 120'.

Figure 12:
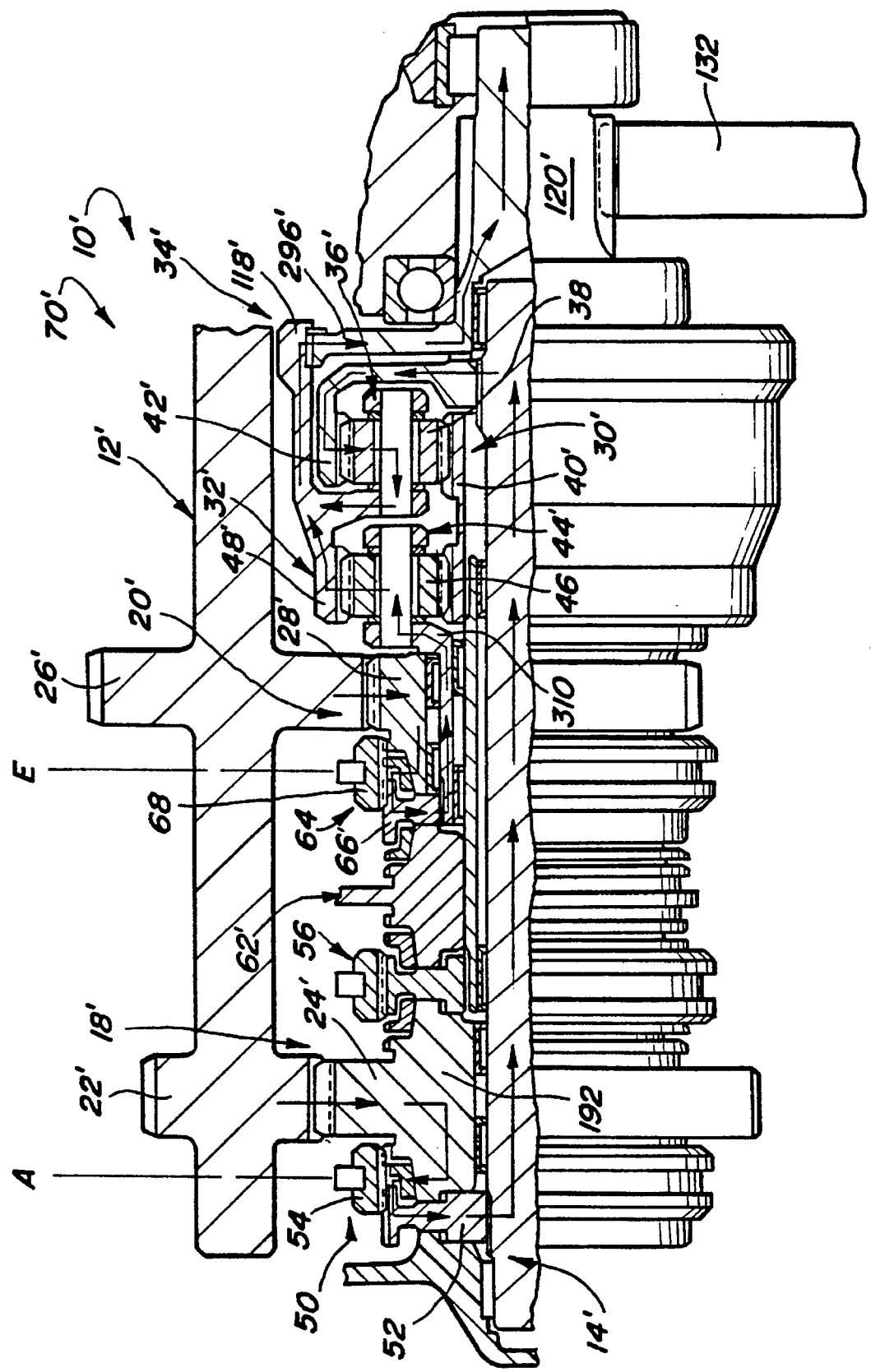
FIG. 12 is a view similar to that of FIG. 8 showing the planetary geartrain in another split path gear mode.

With respect to FIG. 12, the clutch positions are illustrated when the transmission is in its Fourth (4th) forward gear or drive mode. In this gear, first clutch sleeve 54 is moved to its "A" position for coupling first gearset 18' to mainshaft 14'. Simultaneously, third clutch sleeve 68 is moved to its "E" position for coupling second gearset 20' to carrier 44' of second planetary 32'. As with the above-described arrangement, power is transmitted from the power source and its path is split between the source and the double planetary gearset assembly 34'. Power is then recollected to drive output drum 118' and the output gear 120'.

While possible split path arrangements of the present invention have been set forth above in its preferred embodiment, it must be understood that other arrangements may be made as would be understood by those skilled in the art.

FIG. 13 is a chart that sets forth the brake and clutch arrangements for all speeds of the present invention. Reverse, first, and fourth speeds have been described above.

In second gear, first clutch sleeve 54 is in its "A" position for coupling first gearset 18' to mainshaft 14'. Concurrently, second clutch sleeve 60 is moved to its "C" position for coupling sun gear 40' to brake 62', thereby locking sun gear 40' against rotation. Power for the second gear drive mode is transmitted from the power source through first gearset 18' to ring gear 42' via mainshaft 14' and drive plate 296'. Since sun gear 40' is locked against rotation, ring gear 42' drives pinions 38 to rotate about sun gear 40' whereby carrier 36', output drum 118' and output gear 120' are driven at the second gear ratio.

In third gear, first clutch sleeve 54 is in its "A" position for coupling first gearset 18' to mainshaft 14'. At the same time, second clutch sleeve 60 is moved to its "B" position for directly coupling sun gear 40' to first gearset 18'. Thus, first gearset 18' concurrently drives sun gear 40' and ring gear 42' of first planetary gearset 30' for driving carrier 36' and output drum 118' at the third gear ratio relative the speed of input shaft 12'.

In fifth gear, second clutch sleeve 60 is positioned in its "B" position for coupling first gearset 18' to sun gear 40'. Concurrently, third clutch sleeve 68 is positioned in its "E" position for coupling second gearset 20' to carrier 44' of second planetary gearset 32'. As seen, first gearset 18' drives sun gear 40' while second gearset 20' drives carrier 44'. As such, ring gear 48' is the output member of second planetary gearset 32' which, in turn, drives output drum 118' and output gear 120' at the fifth gear ratio.

Finally, in sixth gear, second clutch sleeve 60 is moved to its "C" position for coupling sun gear 40' to brake 62', thereby locking sun gear 40' against rotation. Concurrently, third clutch sleeve 68 is moved to its "E" position for coupling second gearset 20' to carrier 44' of second planetary gearset 32'. Since sun gear 40' is fixed, carrier 44' drives ring gear 48' and, in turn, output drum 118' at a further reduced speed relative to the rotary speed of input shaft 12'.

It must be understood that while the above-described embodiment is a preferred embodiment, it is one of many possible variations that is constructed to have split paths. Furthermore, the steps set forth above in FIG. 2 are the result of using a sun-to-ring ratio of 0.47 while the selected ratios of the gearsets delivering engine input are 0.85 and 1.35. These ratios may be readily changed while still using the present planetary array to achieve different gear ratios and different output speeds, as directed by the needs of the particular application.

Figure 14:
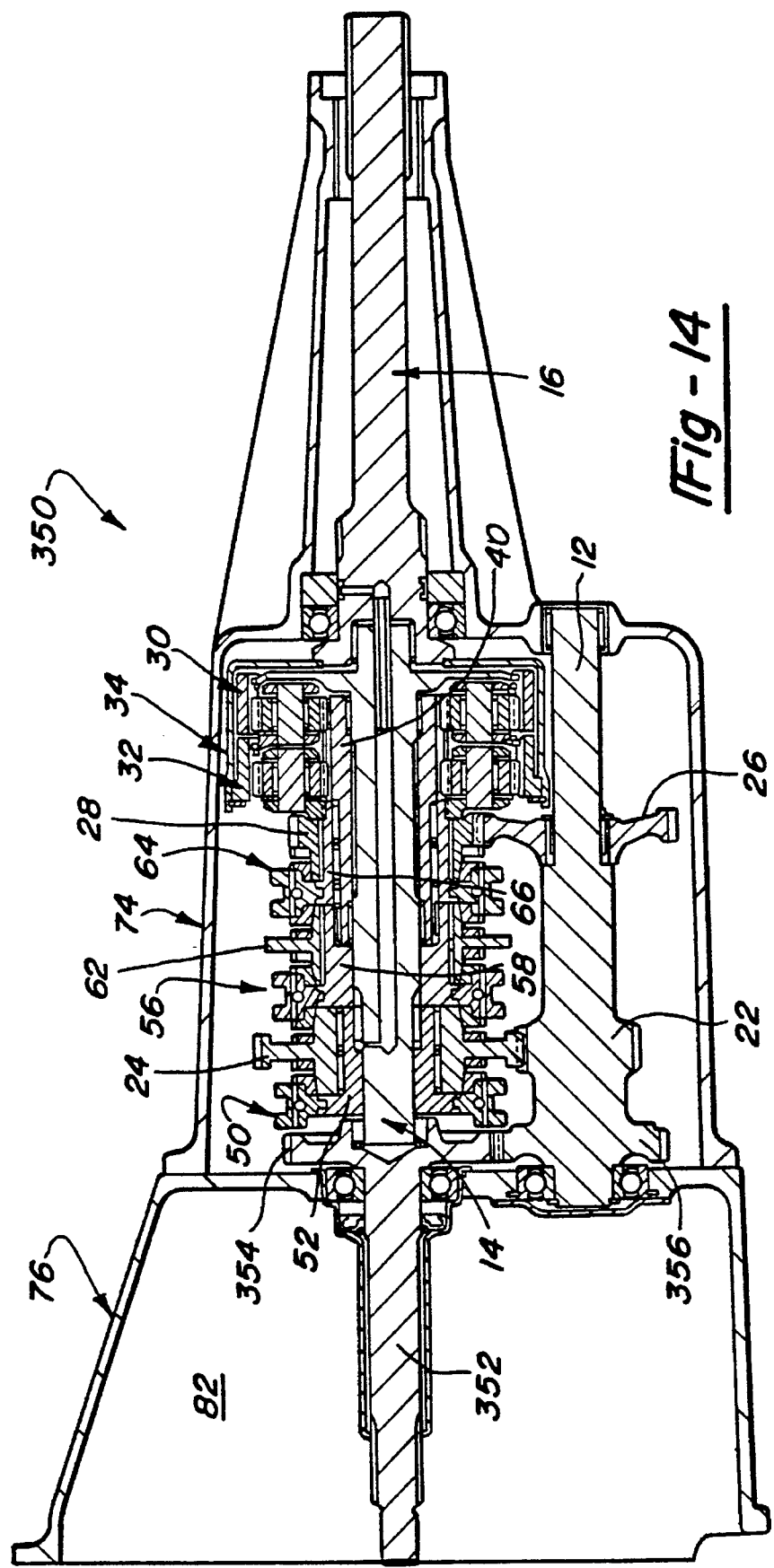
FIG. 14 is a sectional view of a six-speed transmission equipped with the double planetary gearset of the present invention and which is adapted for use in rear-wheel drive applications.

FIG. 14 is a sectional view of an alternate embodiment of a six speed transmission 350 of the present invention particularly well-suited for a rear-wheel drive (RWD) application. In general, transmission 350 is equipped with geartrain 10 as set forth above in FIGS. 1 and 6. As seen, the output of geartrain 10 is output shaft 16 that is aligned in a common rotational axis with mainshaft 14 and an input stub shaft 352. Input stub shaft 352 is supported for rotation relative to mainshaft 14 and includes a drive gear 354 that is in constant mesh with a drive gear 356 on input shaft 12. It will be appreciated that transmission 350 is shown to illustrate an exemplary RWD application for geartrain 10 with the distinct speed ratios established by movement of the three clutch sleeves in the manner previously described.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. A multi-speed transmission for use in a motor vehicle comprising:

a transmission housing;

a brake fixed to said housing;

an input shaft supported for rotation in said transmission housing;

a first input gear fixed to said input shaft for rotation therewith;

a second input gear fixed to said input shaft for rotation therewith;

a mainshaft supported for rotation in said transmission housing;

a first drive gear supported for rotation on said mainshaft and in constant mesh with said first input gear;

a second drive gear supported for rotation on said mainshaft and in constant mesh with said second input gear;

an output shaft supported for rotation in said transmission housing;

a double planetary gearset including a sun gear supported from said mainshaft for rotation relative thereto, a first ring gear fixed to said mainshaft for rotation therewith, a first pinion carrier coupled to said output shaft and rotatably supporting a plurality of first pinions in constant mesh with said sun gear and said first ring gear, a second ring gear fixed to said output shaft for rotation therewith, and a second pinion carrier rotatably supporting a plurality of second pinions in constant mesh with said sun gear and said second ring gear;

a first clutch including a first hub fixed to said mainshaft for rotation therewith and a first clutch sleeve, said first clutch sleeve being selectively movable from a disengaged position to a gear-engaging position for engagement with said first drive gear;

a second clutch including a second hub coupled to said sun gear for rotation therewith and a second clutch sleeve, said second clutch sleeve being selectively movable in a first direction from a disengaged position to a gear-engaging position for engagement with said first drive gear and in a second direction from said disengaged position to a brake-engaging position for engagement with said brake; and a third clutch including a third hub coupled to said second pinion carrier for rotation therewith and a third clutch sleeve, said third clutch sleeve being selectively movable in said first direction from a disengaged position to brake-engaging position for engagement with said brake and in said second direction from said disengaged position to a gear-engaging position for engagement with said second drive gear.

2. The multi-speed transmission of claim 1, wherein said output shaft is in axial alignment with said mainshaft.

3. The multi-speed transmission of claim 1, wherein said output shaft includes a pair of half-shafts interconnected by a differential mechanism permitting speed differentiation between said half-shafts.

4. The multi-speed transmission of claim 1, wherein said first drive gear includes a first side and a second side with said first clutch being situated adjacent said first side of said first drive gear and said second clutch being situated adjacent said second side of said first drive gear.

5. The multi-speed transmission of claim 1, wherein said second drive gear includes a first side and a second side with said third clutch being situated adjacent said first side of said second drive gear and said double planetary gearset being situated adjacent said second side of said second drive gear.

6. The multi-speed transmission of claim 1, wherein said brake is situated between said first and second drive gears.

7. The multi-speed transmission of claim 1, further including an axial hub rotatably mounted on said mainshaft, said axial hub having a first end and a second end with said second hub of said second clutch being coupled to said first end of said axial hub and said sun gear being coupled to said second end of said axial hub.

8. The multi-speed transmission of claim 7, further including a second axial hub rotatably mounted on said axial hub, said second axial hub having a first end and a second end with said third hub of said third clutch being coupled to said first end of said second axial hub and said second pinion carrier being coupled to said second end of said second axial hub.

9. The multi-speed transmission of claim 1, further comprising a shift mechanism for selectively controlling coordinated movement of said first, second and third clutch sleeves to establish six forward gear ratios.

10. The multi-speed transmission of claim 9, wherein said shift mechanism includes a first motor for axially moving said first clutch sleeve, a second motor for axially moving said second clutch sleeve, a third motor for axially moving said third clutch sleeve, and a controller for controlling coordinated actuation of said motors.

11. The multi-speed transmission of claim 10, wherein said controller is adapted to receive input signals from a transmission shift switch indicating movement of a manually-operated shift member for signalling which particular drive mode has been selected, and wherein said controller controls actuation of said motors in response to said input signals.

12. The multi-speed transmission of claim 1, wherein said transmission further includes a power transmission path through said input shaft, said mainshaft, said double planetary gearset, and said output shaft, said transmission further including means for splitting said power transmission path into two power transmission paths and for recollecting said two power transmission paths into a single output power transmission path.

13. A multi-speed transmission for use in a motor vehicle comprising:

a transmission housing;

a brake fixed to said housing;

an input shaft rotatably mounted in said transmission housing;

a first gearset driven by said input shaft;

a second gearset driven by said input shaft;

a mainshaft rotatably mounted in said transmission housing;

an output shaft rotatably mounted in said transmission housing;

a double planetary gearset supported from said mainshaft and having rotary elements including a sun gear supported for rotation relative to said mainshaft, a first ring gear coupled to said mainshaft for rotation therewith, a first pinion carrier rotatably supporting a plurality of first pinions in mesh with said sun gear and said first ring gear, a second ring gear, and a second pinion carrier rotatably supporting a plurality of second pinions in mesh with said sun gear and said second ring gear;

drive means for coupling said first pinion carrier and said second ring gear to said output shaft;

a first synchronizer clutch including a first clutch hub fixed to said mainshaft for rotation therewith and a first clutch sleeve supported for rotation with said first clutch hub and axial movement thereon, said first clutch sleeve being selectively movable from a disengaged position to a gear-engaging position for coupling said first gearset to said mainshaft;

a second synchronizer clutch including a second clutch hub interconnected to said sun gear for rotation therewith and a second clutch sleeve supported for rotation with said second clutch hub and axial movement thereon, said second clutch sleeve being selectively movable in a first direction from a disengaged position to a gear-engaging position for coupling said first gearset to said sun gear, and in a second direction from said disengaged position to a brake-engaging position for coupling said sun gear to said brake; and a third synchronizer clutch including a third clutch hub interconnected for rotation with said second pinion carrier and a third clutch sleeve supported for rotation with said third clutch hub and axial movement thereon, said third clutch sleeve being selectively movable in said first direction from a disengaged position to a brake-engaging position for coupling said second pinion carrier to said brake, and in said second direction from said disengaged position to a gear-engaging position for coupling said second pinion carrier to said second gearset.

14. The multi-speed transmission of claim 13, wherein said output shaft includes a pair of half-shafts interconnected by a differential mechanism permitting speed differentiation between said half-shafts, said differential mechanism coupled for rotation with said drive means.

15. The multi-speed transmission of claim 13, wherein said output shaft is in axial alignment with said mainshaft.

16. The multi-speed transmission of claim 13, wherein said first gearset includes a first input gear fixed to said input shaft and a first drive gear journalled on said mainshaft that is in constant mesh with said first input gear, and wherein said second gearset includes a second input gear fixed to said input shaft and a second drive gear that is in constant mesh with said second input gear.

17. The multi-speed transmission of claim 16, wherein said first drive gear includes a first side and a second side with said first synchronizer clutch being situated adjacent said first side of said first drive gear and said second synchronizer clutch being situated adjacent said second side of said first drive gear.

18. The multi-speed transmission of claim 17, wherein said second drive gear includes a first side and a second side with said third synchronizer clutch being situated adjacent said first side of said second drive gear and said double planetary gearset being situated adjacent said second side of said second drive gear.

19. The multi-speed transmission of claim 18, wherein said brake is situated between said first and second drive gears.

20. The multi-speed transmission of claim 13, further including an inner hub rotatably mounted on said mainshaft, said inner hub having a first end and a second end with said second clutch hub being interconnected to said first end of said hub and said sun gear being interconnected to said second end of said hub.

21. The multi-speed transmission of claim 20, further including an outer hub rotatably mounted on said inner hub, said outer hub having a first end and a second end with said third clutch hub being coupled to said first end of said outer hub and said second pinion carrier being coupled to said second end of said outer hub.

22. The multi-speed transmission of claim 13, wherein said transmission includes a power transmission path through said input shaft, said mainshaft, said double planetary gearset, and said output shaft, said transmission further including means for splitting said power transmission path into two power transmission paths and for recollecting said two power transmission paths into a single power transmission path.

23. A geartrain for a multi-speed manual transmission of the type having an input shaft, a mainshaft, and an output shaft, with all of the shafts supported for rotation from a transmission housing, the housing including a stationary brake mounted thereto, said geartrain comprising:

a double planetary gearset surrounding the mainshaft, said double planetary gearset having rotary elements including a first member fixed to the mainshaft for rotation therewith, a second member fixed to the output shaft for rotation therewith, a third member that is releasably engageable with the input shaft for rotation therewith, and a fourth member that is releasably engageable with the input shaft for rotation therewith;

a first power transmission route including a first clutch and a second clutch, said first clutch being movable between a neutral position and a driving position and said second clutch being movable between a driving position, a neutral position, and a braked position;

a second power transmission route including a third clutch, said third clutch being movable between a braked position, a neutral position, and a driving position;

shift means for moving said first, second and third clutches such that movement of said first clutch to said driving position couples said first member with said input shaft, wherein movement of said second clutch to said driving position couples said fourth member to said input shaft and movement of said second clutch to said braked position couples said fourth member with said brake, and wherein movement of said third clutch to said driving position couples said third member to said input shaft and movement of said third clutch to said braked position couples said third member with said brake.

24. The geartrain for a multi-speed transmission of claim 23, wherein movement of said first clutch to its driving position and said third clutch to its braked position establishes a first gear ratio, movement of said first clutch to its driving position and said second clutch to its braked position establishes a second gear ratio, movement of said first clutch to its driving position and said second clutch to its driving position establishes a third gear ratio, movement of said first clutch to its driving position and said third clutch to its driving position establishes a fourth gear ratio, movement of said second clutch to its driving position and said third clutch to its driving position establishes a fifth gear ratio, and movement of said second clutch to its braked position and said third clutch to its driving position establishes a sixth speed ratio.

25. The geartrain for a multi-speed transmission of claim 24, wherein each of said first through sixth gear ratios establishes a forward drive mode for defining a six-speed transmission.

26. The geartrain for a multi-speed transmission of claim 25, wherein positioning of said second clutch in its braked position and said third clutch in its braked position establishes a locked park mode, and positioning of said second clutch in its driving position and said third clutch in its braked position establishes a reverse drive mode.

27. The geartrain for a multi-speed transmission of claim 26, wherein said shift means includes a first motor for moving said first clutch, a second motor for moving said second clutch, a third motor for moving said third clutch, and a controller for controlling coordinated actuation of said motors.

28. The geartrain for a multi-speed transmission of claim 27, wherein said controller is adapted to receive input signals from a transmission shift switch indicating movement of a manually-operated shift member for signalling which particular drive mode has been selected, and wherein said controller controls actuation of said motors in response to said input signals.

29. The geartrain for a multi-speed transmission of claim 23, wherein said geartrain further includes a power transmission path through said input shaft, said mainshaft, said double planetary gearset, and set output shaft, said geartrain further including means for splitting said power transmission path into two power transmission paths and for recollecting said two power transmission paths into a single power transmission path.

30. A multi-speed transmission for use in a motor vehicle comprising:

a housing;

a brake fixed to said housing;

an input shaft supported for rotation in said housing;

a first input gear fixed to said input shaft;

a second input gear fixed to said input shaft;

a mainshaft supported for rotation in said housing;

a first drive gear supported for rotation on said mainshaft and in constant mesh with said first input gear;

a second drive gear supported for rotation on said mainshaft and in constant mesh with said second input gear;

an output gear supported for rotation on said mainshaft;

a pair of axle shafts supported for rotation in said housing;

a differential interconnecting said output gear to said axle shafts to permit speed differentiation therebetween;

a double planetary gearset including a sun gear supported for rotation on said mainshaft, a first ring gear fixed to said mainshaft, a first pinion carrier fixed to said output gear and rotatably supporting a plurality of first pinions in constant mesh with said sun gear and said first ring gear, a second ring gear fixed to said output gear, and a second pinion carrier rotatably supporting a plurality of second pinions in constant mesh with said sun gear and said second ring gear;

a first clutch fixed for rotation with said mainshaft, said first clutch movable between a disengaged position and a gear-engaging position whereat said first drive gear is coupled to said mainshaft;

a second clutch fixed for rotation with said sun gear, said second clutch movable in a first direction from a disengaged position to a gear-engaging position whereat said first drive gear is coupled to said sun gear and in a second direction from said disengaged position to a brake-engaging position whereat said brake is coupled to said sun gear; and a third clutch fixed for rotation with said second pinion carrier, said third clutch movable in a first direction from a disengaged position to a brake-engaging position whereat said brake is coupled to said second pinion carrier and in a second direction from said disengaged position to a gear-engaging position whereat said second drive gear is coupled to said second pinion carrier.

31. The multi-speed transmission of claim 30 further comprising a shift mechanism for selectively controlling coordinated movement of said first, second and third clutches to establish six forward gear ratios and a reverse gear ratio.

32. A multi-speed transmission for a motor vehicle comprising:

a housing;

a brake fixed to said housing;

an input shaft supported for rotation in said housing;

a first gearset driven by said input shaft;

a second gearset driven by said input shaft;

a mainshaft supported for rotation in said housing;

an output supported in said housing for rotation relative to said input shaft and said mainshaft;

a double planetary gearset having rotary elements including a first member fixed to said mainshaft for rotation therewith, a second member fixed to said output for rotation therewith, a third member that is releasably engagable with said input shaft for rotation therewith, and a fourth member that is releasably engagable with said input shaft for rotation therewith;

a first clutch that is movable between a neutral position and a driving position whereat said first member is coupled for rotation with said first gearset;

a second clutch that is movable from a neutral position to a driving position whereat said fourth member is coupled for rotation with said first gearset and to a brake position whereat said fourth member is coupled to said brake;

a third clutch that is movable from a neutral position to a driving position whereat said third member is coupled for rotation with said second gearset and to a brake position whereat said third member is coupled to said brake; and a shift mechanism for moving said first, second and third clutches between said positions.

33. The multi-speed manual transmission of claim 32 wherein movement of said first clutch to its driving position and said third clutch to its braked position establishes a first gear ratio, movement of said first clutch to its driving position and said second clutch to its braked position establishes a second gear ratio, movement of said first clutch to its driving position and said second clutch to its driving position establishes a third gear ratio, movement of said first clutch to its driving position and said third clutch to its driving position establishes a fourth gear ratio, movement of said second clutch to its driving position and said third clutch to its driving position establishes a fifth gear ratio, and movement of said second clutch to its braked position and said third clutch to its driving position establishes a sixth speed ratio.

34. The multi-speed manual transmission of claim 32 wherein said output includes an output gear supported for rotation on said mainshaft, a pair of axle shafts, and a differential driven by said output gear and interconnecting said axle shafts.

* * * * *